United States Patent
Lee et al.

(10) Patent No.: US 7,118,342 B2
(45) Date of Patent: Oct. 10, 2006

(54) FLUTED TIP TURBINE BLADE

(75) Inventors: Ching-Pang Lee, Cincinnati, OH (US); James Robert Bailey, Cincinnati, OH (US); Nicholas Charles Palmer, Loveland, OH (US); Wenfeng Lu, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/937,642

(22) Filed: Sep. 9, 2004

(65) Prior Publication Data

US 2006/0051209 A1    Mar. 9, 2006

(51) Int. Cl.
*F01D 5/14* (2006.01)

(52) U.S. Cl. .................. 416/97 R; 416/236 R

(58) Field of Classification Search ........... 416/92, 416/95, 96 R, 97 R, 235, 236 R
See application file for complete search history.

(56) References Cited

U.S. PATENT DOCUMENTS

| | | | |
|---|---|---|---|
| 4,142,824 A | 3/1979 | Anderson | |
| 4,893,987 A | 1/1990 | Lee et al. | |
| 5,261,789 A | 11/1993 | Butts et al. | |
| 5,476,364 A | 12/1995 | Kildea | |
| 5,503,527 A | 4/1996 | Lee et al. | |
| 5,564,902 A | 10/1996 | Tomita | |
| 5,660,523 A | 8/1997 | Lee | |
| 6,039,531 A | 3/2000 | Suenaga et al. | |
| 6,086,328 A | 7/2000 | Lee | |
| 6,527,514 B1 * | 3/2003 | Roeloffs | 416/97 R |
| 6,554,575 B1 | 4/2003 | Leeke et al. | |
| 6,672,829 B1 | 1/2004 | Cherry et al. | |
| 6,672,832 B1 | 1/2004 | Leeke et al. | |
| 6,790,005 B1 | 9/2004 | Lee et al. | |

FOREIGN PATENT DOCUMENTS

DE    1 033 678    7/1958

* cited by examiner

*Primary Examiner*—Edward K. Look
*Assistant Examiner*—Richard A. Edgar
(74) *Attorney, Agent, or Firm*—William S. Andes; Francis L. Conte

(57) ABSTRACT

A turbine blade includes an airfoil having pressure and suction sidewalls extending between leading and trailing edges and root and tip. The tip includes squealer ribs extending from a tip floor forming an open tip cavity. The rib along the pressure sidewall has a squared external corner, and a flute extends along the base of the rib at the tip floor.

22 Claims, 3 Drawing Sheets

FLUTED TIP TURBINE BLADE

BACKGROUND OF THE INVENTION

The present invention relates generally to gas turbine engines, and, more specifically, to turbine blade cooling.

In a gas turbine engine air is pressurized in a compressor and mixed with fuel in a combustor for generating hot combustion gases. Energy is extracted from the gases in several turbine stages which power the compressor and produce useful work such as powering an upstream fan in a turbofan aircraft engine application.

Each turbine stage includes a stationary turbine nozzle which directs the combustion gases through a corresponding row of turbine rotor blades extending radially outwardly from a supporting rotor disk.

The stator vanes and rotor blades include hollow airfoils with internal cooling circuits therein which use air bled from the compressor for cooling thereof during operation. Each stage of vanes and blades is configured differently for maximizing energy extraction from the combustion gases as they flow downstream through the turbine during operation. Each vane and blade also includes different cooling configurations specifically tailored to different heat loads from the combustion gases as they flow downstream over the pressure and suction sides thereof.

The typical turbine blade includes an airfoil having a radially outer tip spaced closely adjacent to a surrounding turbine shroud forming a small clearance or gap therebetween. During operation, the combustion gases flow over the pressure and suction sides of the turbine blade, and a small portion of the combustion gases leaks past the blade tip through the small tip clearance.

The blade tip is particularly difficult to cool since it is exposed to the hot combustion gases on both the pressure and suction sides of the airfoil between the leading and trailing edges, as well as over the tip itself in the tip-shroud gap.

Since blade tips are subject to occasional tip rubs with the surrounding turbine shroud, the tips typically include short height squealer ribs extending radially outwardly from a tip floor which defines an outwardly open tip cavity. The tip floor defines the outer boundary for the internal cooling circuits of the airfoil, and positions the squealer ribs externally thereof which further increases the difficulty of tip cooling during operation.

Accordingly, turbine blade tips are subject to oxidation over extended use in the engine, and may require corresponding repair during maintenance outages of the engine. Oxidation damage to the blade tip commonly limits the useful life of the blade during operation, as well as decreases turbine efficiency as the blade tips oxidize and wear during operation and correspondingly increase the blade tip clearance.

Two significant improvements in blade tip cooling are found in U.S. Pat. Nos. 5,261,789 and 6,672,829, both assigned to the present assignee. In the earlier patent, a tip shelf is introduced along the pressure side of the turbine blade to offset inwardly the pressure side squealer rib for enhancing tip cooling by shielding the tip with a cooling air film for protection against the radial migration of combustion gases over the tip during operation.

The later patent discloses an inclined pressure side squealer rib at the tip shelf for protecting the cooling air film created threat for enhancing tip performance.

However, since the blade tips are subject to occasional tip rubbing with the surrounding turbine shroud, the squealer ribs are subject to abrasion wear which affects both efficiency of blade tip performance, and effectiveness of the tip shelf cooling.

Accordingly, it is desired to provide a turbine blade with enhanced tip cooling notwithstanding tip rubs.

BRIEF DESCRIPTION OF THE INVENTION

A turbine blade includes an airfoil having pressure and suction sidewalls extending between leading and trailing edges and root and tip. The tip includes squealer ribs extending from a tip floor forming an open tip cavity. The rib along the pressure sidewall has a squared external corner, and a flute extends along the base of the rib at the tip floor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
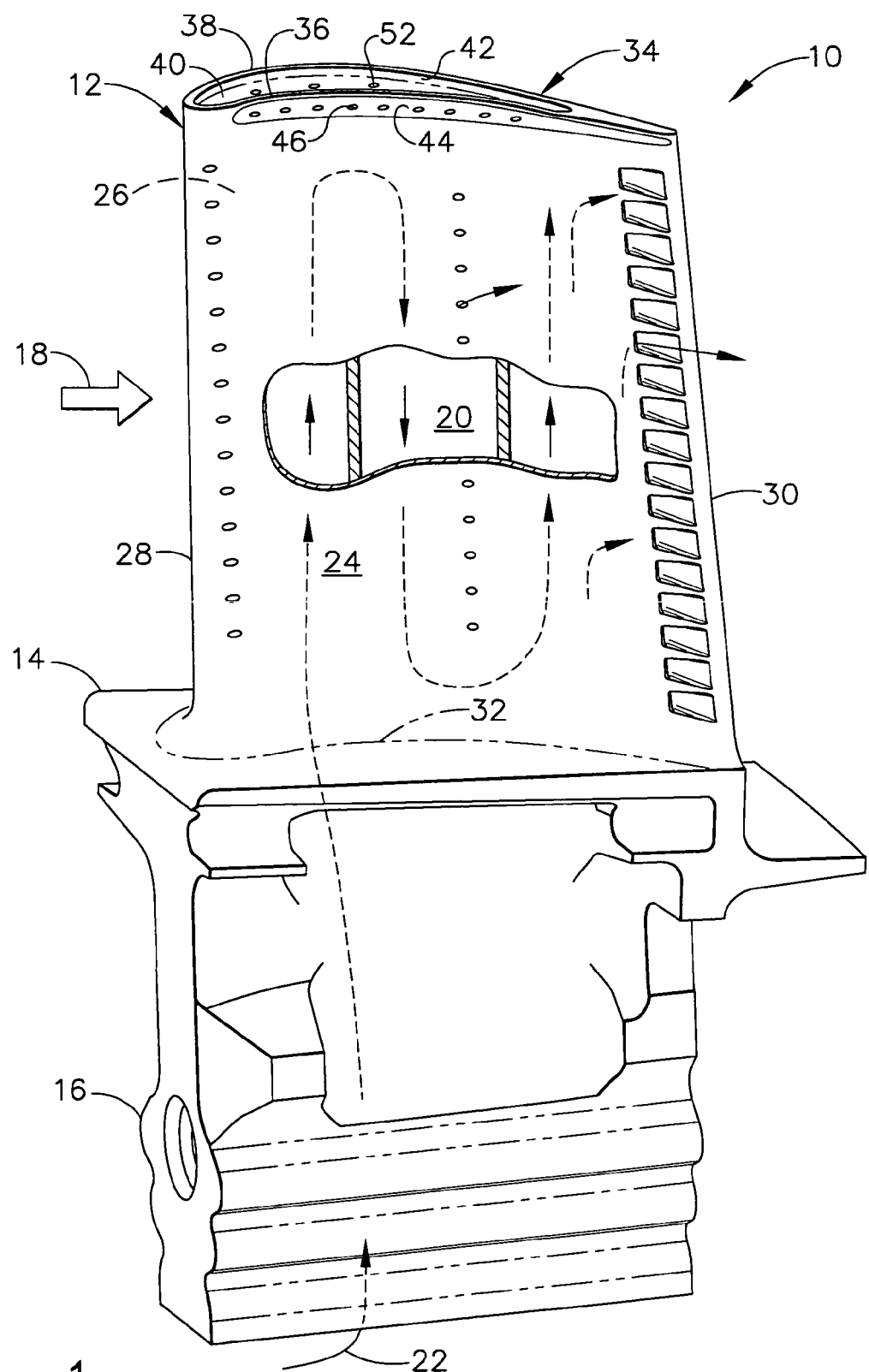
FIG. 1 is an elevational isometric view of a turbine rotor blade in an exemplary configuration.

Illustrated in FIG. 1 is a turbine rotor blade 10 for a gas turbine engine. The blade includes a hollow airfoil 12 integrally joined in turn to a radially inner platform 14 and dovetail 16. The exemplary dovetail is an axial entry dovetail with multiple tangs or lobes supported in a complementary dovetail slot in the perimeter of a rotor disk (not shown).

A full row of the turbine blades 10 extends radially outwardly from the supporting rotor disk and receives combustion gases 18 from an upstream combustor (not shown) for extracting energy therefrom to power the engine compressor (not shown) during operation.

The hollow airfoil includes an internal cooling circuit 20 therein which receives through an inlet channel in the dovetail cooling air 22 bled from the compressor during operation. The cooling circuit may have any conventional configuration, such as the three-pass serpentine cooling circuit illustrated which discharges the spent cooling air through various rows of film cooling holes through the airfoil between its leading and trailing edges in any conventional manner.

The airfoil 12 includes a generally concave pressure sidewall 24, and a laterally or circumferentially opposite, generally convex suction sidewall 26 extending chordally or axially in chord between opposite leading and trailing edges 28,30, and in longitudinal or radial span from a root 32 at the platform 14 to a radially outer tip 34 at the distal end of the airfoil.

Figure 2:
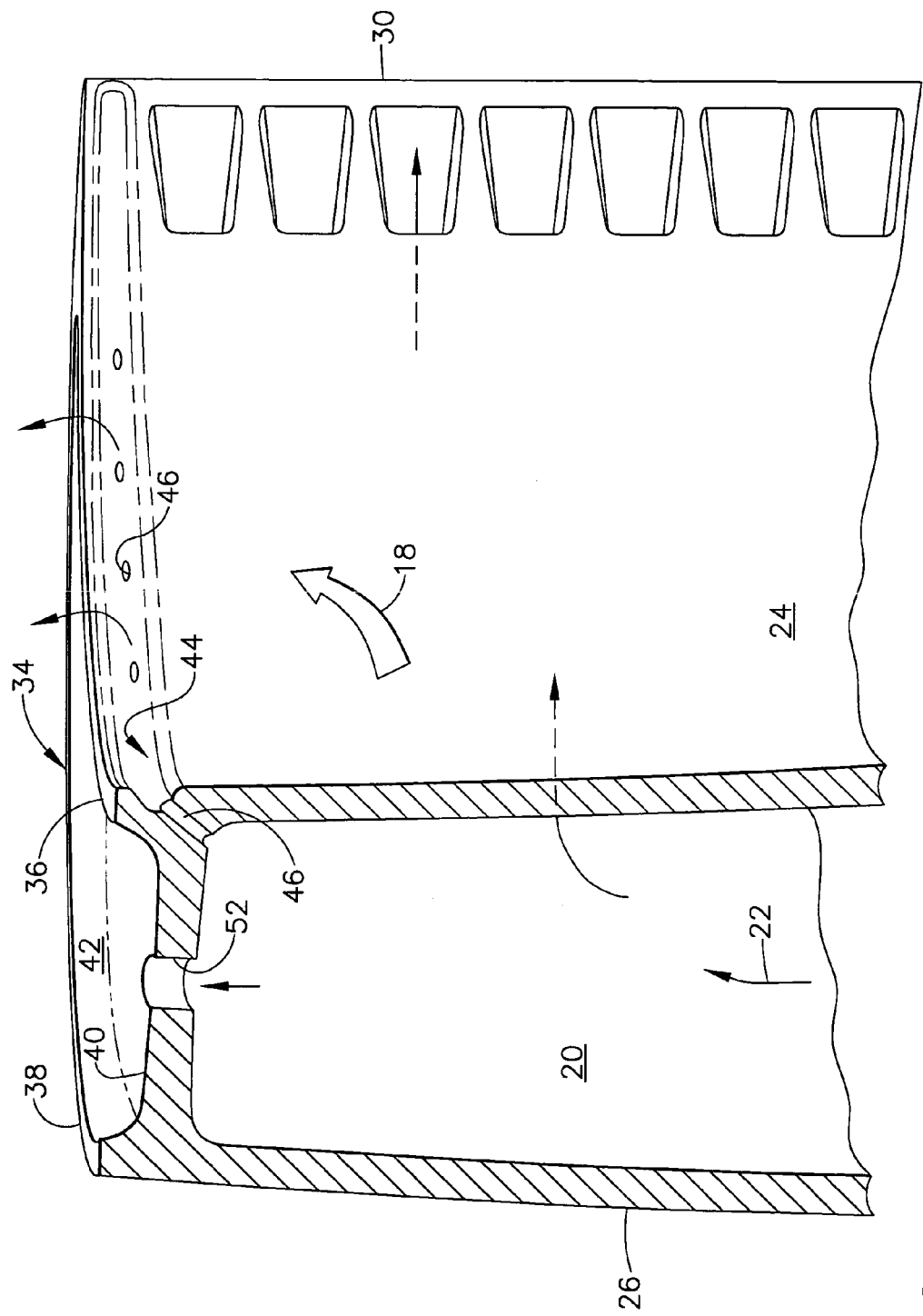
FIG. 2 is a partly sectional, isometric view of a portion of the blade tip illustrated in FIG. 1.

As best illustrated in FIG. 2, the airfoil tip 34 includes a first squealer rib 36 along the pressure sidewall, and an opposite second squealer rib 38 along the suction sidewall which are integrally joined together at the leading and trailing edges 28,30 as additionally illustrated in FIG. 1. The two ribs 36,38 extend radially outwardly from a common tip floor 40 which bridges the pressure and suction sidewalls of the airfoil and forms therebetween a tip cavity 42 open or exposed radially outwardly to face the radially surrounding turbine shroud (not shown) when mounted in the gas turbine engine.

The two squealer ribs 36,38 illustrated in FIG. 2 provide radial extensions of the corresponding pressure and suction sidewalls 24,26 outwardly above the tip floor 40 and terminate in substantially squared internal corners around the tip cavity 42 and external corners aligned radially with the corresponding external pressure side or surface of the pressure sidewall 24 and suction side or external surface of the suction sidewall 26. However, an elongate furrow or flute 44 is provided as a groove in the external surface of the pressure sidewall and extends chordally along the base of the first rib 36 at its junction with the tip floor 40.

Figure 3:
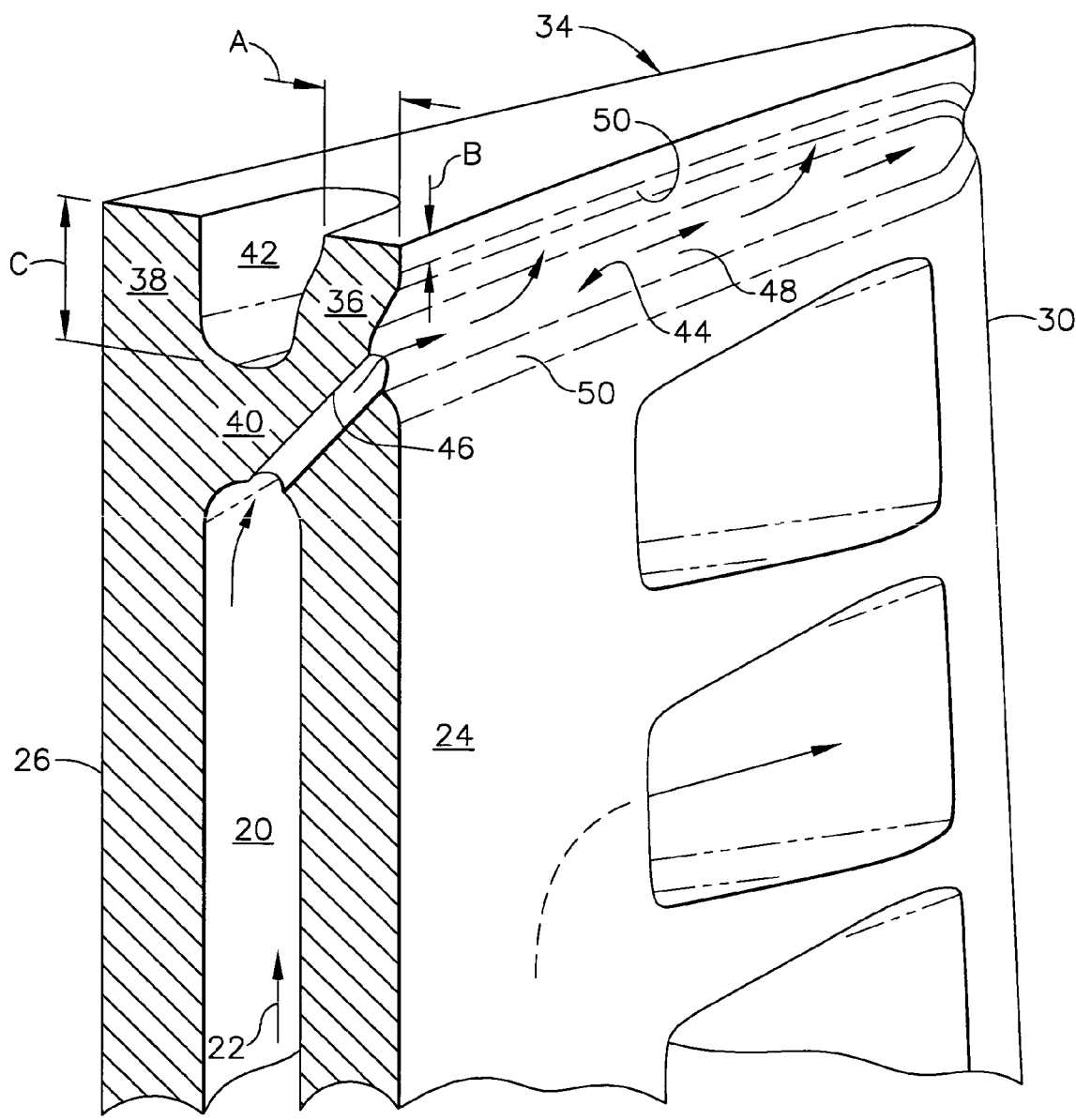
FIG. 3 is an enlarged, partly sectional view of the blade tip illustrated in FIG. 2.

As illustrated in enlarged view in FIG. 3, the first rib 36 forms a radial extension of the common pressure sidewall 24 and therefore conforms in width A with the width of the pressure sidewall, and is generally equal thereto. Similarly, the second rib 38 forms an extension of the suction sidewall 26 and conforms in width thereto, which widths are substantially equal.

The second rib 38 thusly shares the common external surface of the suction sidewall 26 in a coplanar configuration along the full extent of the second rib between the leading and trailing edges.

In contrast, the continuity of the first rib 36 with the external surface of the pressure sidewall 24 is interrupted radially by the flute 44 which offsets or recesses the base of the first rib 36 inwardly toward the tip cavity and away from the external pressure surface of the airfoil. In this way, the exposed external corner of the first rib 36 above the flute 44 is radially aligned with or coplanar with the external pressure surface of the pressure sidewall below the flute 44, with the flute being in the form of a recess in the otherwise coextensive flat external surface of the pressure sidewall.

As illustrated in FIG. 1, the first and second ribs 36,38 begin at the leading edge of the airfoil and join together in a common rib at the trailing edge of the airfoil. The flute 44 commences in the pressure sidewall 24 immediately behind or near the airfoil leading edge and extends aft toward the trailing edge 30 at least along the extent of the tip cavity 42. As best illustrated in FIGS. 2 and 3, the flute 44 preferably extends past the tip cavity 42 to the trailing edge 30 itself, and is spaced below the radially outer surface of the tip 34.

As best illustrated in FIG. 3, the flute 44 is preferably disposed solely in the lower portion of the first rib 36 along the tip floor 40 to the trailing edge of the blade, and not in the outer portion of the first rib 36 which maintains its generally square cross section conforming with the generally square cross section of the second rib 38. In this way, the first rib 36 maintains a squared distal end of radial height B with a corresponding flat external surface of the corresponding height B which is generally coplanar with the flat external surface of the pressure sidewall 24 below the flute.

The height B of the squared end of the first rib 36 may be about 5–10 mils which represents a minor portion of the full depth C of the tip cavity, which is about 40–60 mils. In this way, the squared ends of both squealer ribs 36,38 are available for occasional tip rubbing with the surrounding turbine shroud and enjoy enhanced strength without compromising the configuration of the ribs or their performance following tip rubbing.

To improve the cooling performance of the blade tip, a row of inclined film cooling holes 46 is disposed along the length of the flute 44 as illustrated in the three figures, and extends from the internal cooling circuit 20 through the tip floor 40 and into the flute. The film cooling holes may have any conventional configuration and size, and typically are inclined both radially and chordally aft with a compound inclination angle for introducing cooling air inside the flute for forming a continuous film of cooling air therein for discharge therefrom over the blade tip during operation.

As shown in FIG. 3, the flute 44 is a local groove at the blade tip in the otherwise continuous external pressure surface thereof and terminates below the squared external corner of the first rib 36. In this way, the flute 44 permits the development of a continuous film of cooling air therein which then flows radially outwardly and around the external corner of the first rib 36 to protect the blade tip from the hot combustion gases 18 which migrate radially outwardly over the blade tip during operation.

The flute 44 provides enhanced cooling protection of the blade tip from where it commences near the leading edge of the airfoil to its termination at the thin trailing edge 30 of the airfoil. And, the squared corner configuration of the first rib 36 maintains its structural strength and integrity during tip rubbing, as well as maintains the original size of the flute 44 which is protected from tip rubbing by the height B of the additional material provided thereabove.

The exemplary flute 44 illustrated in FIG. 3 is generally symmetrical in radial or vertical cross section, and includes a concave center fillet 48 as illustrated in FIG. 3 which blends symmetrically radially outwardly and inwardly with corresponding outer and inner convex radii 50. The two radii 50 introduce rounded corners or edges with the concave fillet 48 to blend with the external pressure surface of the airfoil both radially below and above the flute 44. In this way, the flute 44 transitions smoothly with the external surface of the airfoil and enhances the formation of the film cooling layer discharged from the flute 44 during operation and its protective performance as the hot combustion gases migrate radially outwardly over the flute 44 during operation.

The relative sizes of the center fillet 48 and external radii 50 may be individually varied as desired to correspondingly change the profile and included angle inside the flute for maximizing performance of the flute during operation. However, the outer radius 50 terminates below the external corner of the first rib 36 for maintaining the finite height B at the top of the rib coplanar with the external pressure surface below the rib.

As shown in FIG. 3, the flute 44 may be disposed in lower part along the edge of the tip floor 40, and the film cooling holes 46 are inclined through the tip floor and into the center fillet of the flute 44. In this way, the base of the first rib 36 is internally convection cooled by the row of film cooling holes 46 extending through the base thereof, while being further protected by the cooling film of air discharged from the flute 44 during operation.

The tip may be further cooled by introducing a plurality of tip holes 52 extending radially through the tip floor 40 as illustrated in FIGS. 1 and 2 in flow communication between the cooling circuit 20 and the tip cavity 42. The radial tip holes 52 introduce cooling air inside the tip cavity for cooling the tip ribs on one side, while the opposite side of the first rib 36 is additionally cooled by the cooling air film discharged from the flute 44 in the predominant radial direction of the combustion gas flow over the blade tip from the pressure to suction sides of the blade.

The introduction of the flute 44 in the otherwise radially extending pressure side rib 36 enjoys the benefits of the tip shelf and inclined squealer rib introduced in the above identified two previous patents, while also further enhancing the cooling tip design. The pressure side rib 36 maintains squared corners above the flute for enhanced strength and resistance to tip rubbing. The flute itself is protected from tip rubbing by the squared distal end of the pressure side squealer rib, and therefore maintains its original shape, performance, and cooling ability even following tip rubbing. And, the flute 44 extends for most of the length of the blade tip cavity as well as aft therefrom to the trailing edge of the blade for ensuring effective tip cooling over the majority of the blade tip, and including in particular the relatively thin trailing edge region thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine airfoil comprising:
   laterally opposite pressure and suction sidewalls extending in chord between opposite leading and trailing edges and in span between a root and a tip, and including an internal cooling circuit;
   said tip including first and second squealer ribs extending outwardly from a tip floor to squared internal and external corners thereof; and
   said pressure sidewall includes a flute in the external surface thereof extending chordally along the base of said first rib at said tip floor, and terminating below said squared external corner of said first rib.

2. An airfoil according to claim 1 wherein said flute comprises a concave center fillet blending with outer and inner convex radii.

3. An airfoil according to claim 2 wherein said first rib conforms in width with said pressure sidewall, and is offset at said base thereof inwardly from said external surface by said flute, with said external corner of said first rib above said flute being aligned coplanar with said external surface below said flute.

4. An airfoil according to claim 3 wherein said first and second ribs are integrally joined together at said leading and trailing edges forming a tip cavity open outwardly, and said flute commences in said pressure sidewall behind said leading edge and extends toward said trailing edge along said tip cavity.

5. An airfoil according to claim 4 wherein said flute is disposed solely in a lower portion of said first rib along said tip floor, and not in the outer portion thereof.

6. An airfoil according to claim 5 wherein said flute is disposed in part in said tip floor.

7. An airfoil according to claim 5 wherein said flute extends past said tip cavity to said trailing edge, and below said tip thereat.

8. An airfoil according to claim 5 further comprising a row of film cooling holes extending from said cooling circuit, through said tip floor, into said flute.

9. An airfoil according to claim 8 further comprising a plurality of tip holes extending through said tip floor between said cooling circuit and said tip cavity.

10. An airfoil according to claim 5 wherein said external surface of said pressure sidewall is coplanar around said flute, and includes flat portions below and above said flute.

11. A turbine blade comprising:
    a hollow airfoil integrally joined at a root to a platform and dovetail;
    said airfoil including laterally opposite pressure and suction sidewalls extending in chord between opposite leading and trailing edges and in span from said root to an outer tip at a distal end thereof;
    said tip including first and second squealer ribs extending outwardly from a tip floor bridging said pressure and suction sidewalls and forming therebetween a tip cavity open outwardly; and
    said first rib including a squared external corner aligned with the external surface of said pressure sidewall, and a flute in said external surface extending chordally along the base of said first rib at said tip floor.

12. A blade according to claim 11 wherein said first and second ribs are integrally joined together at said leading and trailing edges, and said flute commences in said pressure sidewall behind said leading edge and extends toward said trailing edge along said tip cavity.

13. A blade according to claim 12 wherein:
    said first rib conforms in width with said pressure sidewall and is offset at said base thereof inwardly from said external surface by said flute; and
    said second rib conforms in width with said suction sidewall and extends outwardly therefrom with a common external surface.

14. A blade according to claim 13 wherein said first rib includes squared internal and external corners.

15. A blade according to claim 14 wherein said squared external corner of said first rib is aligned coplanar with said external surface of said pressure sidewall below said flute.

16. A blade according to claim 14 wherein said flute is symmetrical in cross section.

17. A blade according to claim 14 wherein said flute comprises a concave center fillet blending symmetrically with outer and inner convex radii.

18. A blade according to claim 14 wherein said flute is disposed solely in a lower portion of said first rib along said tip floor, and not in the outer portion thereof.

19. A blade according to claim 18 wherein said flute is disposed in part in said tip floor.

20. A blade according to claim 14 wherein said flute extends past said tip cavity to said trailing edge, and below said tip thereat.

21. A blade according to claim 14 wherein said airfoil further comprises an internal cooling circuit, and a row of film cooling holes extending therefrom and through said tip floor into said flute.

22. A blade according to claim 21 wherein said airfoil further comprises a plurality of tip holes extending through said tip floor between said cooling circuit and said tip cavity.

* * * * *